United States Patent [19]
McMaster et al.

[11] 3,947,242
[45] Mar. 30, 1976

[54] ROLLER HEARTH FURNACE FOR GLASS SHEETS

[76] Inventors: Harold A. McMaster, 707 Riverside Drive, Woodville, Ohio 43469; Norman C. Nitschke, 9102 Buck Road, Perrysburg, Ohio 43551

[22] Filed: Feb. 19, 1975

[21] Appl. No.: 551,450

[52] U.S. Cl. ................. 432/122; 432/244; 432/249
[51] Int. Cl.[2] ........................................... F27B 9/14
[58] Field of Search ........... 432/122, 128, 244, 249, 432/121

[56] References Cited
UNITED STATES PATENTS

| | | | |
|---|---|---|---|
| 2,825,547 | 3/1958 | Vaughan | 432/249 |
| 2,885,197 | 5/1959 | Cope et al. | 432/249 |
| 3,806,312 | 4/1974 | McMaster et al. | 432/121 |
| 3,843,315 | 10/1974 | Sorensen | 432/122 |

*Primary Examiner*—John J. Camby
*Attorney, Agent, or Firm*—Reising, Ethington, Barnard, Perry & Brooks

[57] ABSTRACT

A roller hearth furnace having a plurality of horizontally elongated furnace modules aligned with each other in an end-to-end relationship so a roller conveyor may carry glass sheets horizontally through the furnace and thereby heat the glass prior to tempering. Each furnace module has a hollow construction with a circular cross-section defined by a semicircular lower housing portion and a semicircular upper housing portion. A separate counterbalance mechanism associated with each upper housing portion supports it independently of the others for movement between a lower closed position immediately over its associated lower housing portion and an upper open position where the interior of its associated lower housing portion is accessible. The counterbalance mechanisms each include four chains attached to counterweights in a manner that permits counter-balancing of the associated upper housing portion even if one chain should break. One chain of each counterbalance mechanism is driven by an associated reversible electric motor to raise and lower its upper housing portion, and a separate elongated operator handle extending along the length of each upper housing portion is coupled to the motor thereof so an operator can control the motor operation from any position along the length of the particular furnace module. Each upper housing portion includes end walls that mitigate heat loss when one of them is open while adjacent ones are closed. Upper and lower end walls at each end of the furnace are reinforced to maintain horizontal openings of uniform size where glass enters and leaves the furnace.

29 Claims, 6 Drawing Figures

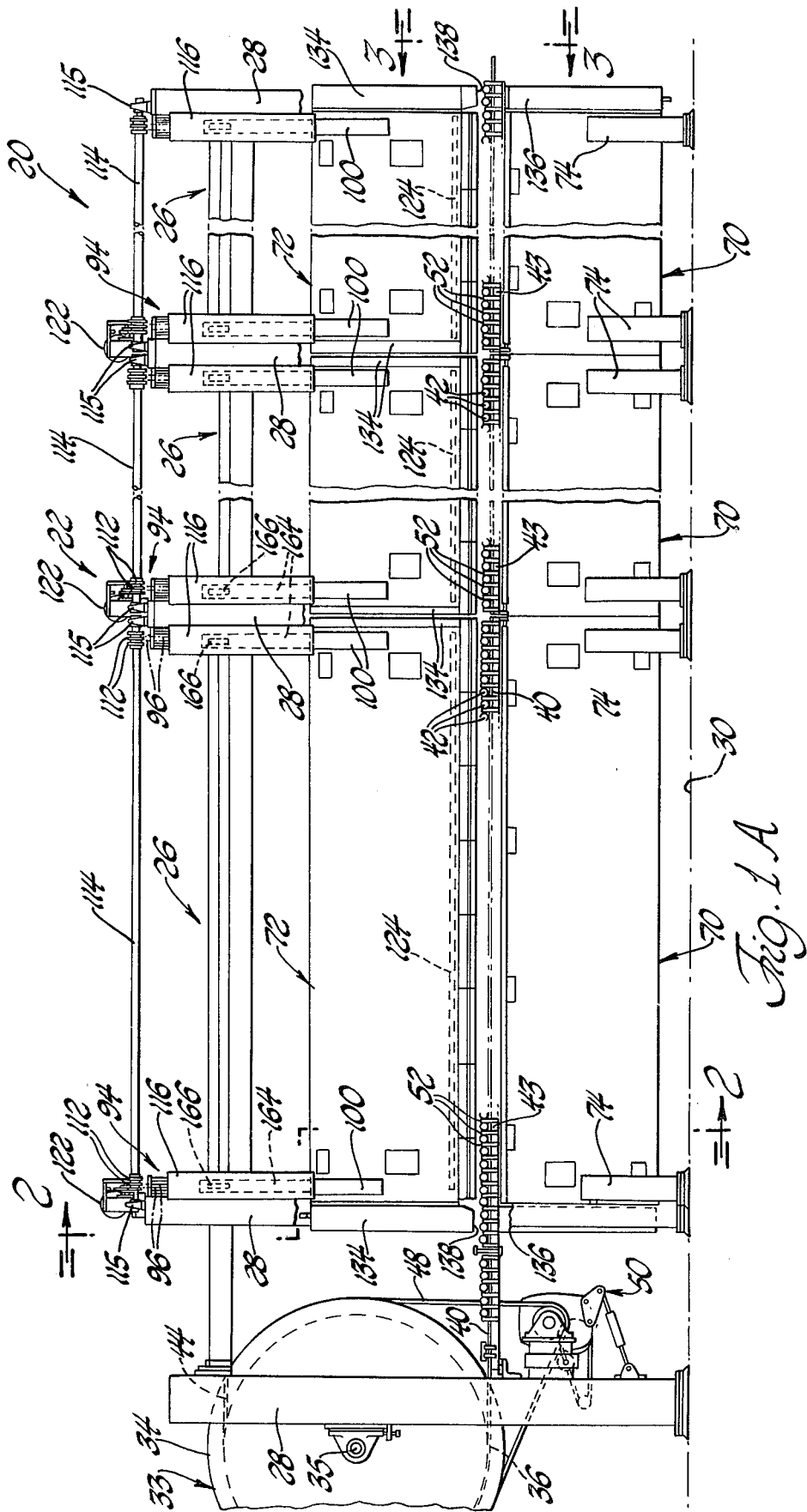

ROLLER HEARTH FURNACE FOR GLASS SHEETS

BACKGROUND OF THE INVENTION

1. Field of the Invention

This invention relates generally to roller hearth furnaces, and more specifically to such furnaces which are used to heat sheets of glass prior to a quench that tempers the glass.

2. Description of the Prior Art

Glass sheets can be tempered by first heating the sheets and then suddenly cooling them to thereby change the mechanical properties of the glass. The tempering operation increases the strength of the glass and also causes the glass to break into small pieces that are dull and relatively harmless instead of into large, sharp pieces.

To perform the tempering of glass sheets, roller hearth furnaces have been developed in the past to heat the glass sheets prior to their cooling which is usually performed by pressurized air that is sprayed onto the glass. Prior art roller hearth furnaces utilize roller conveyors for conveying the glass sheets through the furnace with their planes oriented horizontally and then to a quenching unit where the sudden cooling is performed. Prior art roller hearth furnaces are disclosed by the U.S. Pat. of McMaster et al, No. 3,806,312, issued Apr. 23, 1974, and by the references cited therein. Subsequent to the quenching, cooling units are used to further cool the glass to a temperature where it can be handled.

SUMMARY OF THE INVENTION

One object of the present invention is to provide a roller hearth furnace including a horizontally elongated housing of a hollow construction having a circular cross-section defined by a fixedly mounted upwardly opening lower housing portion of a semicircular cross-section and a movable upper housing portion having a downwardly opening semicircular cross-section that covers the lower housing portion in a closed position to permit a conveyor to carry sheets of glass horizontally through the housing with their planes located at the juncture between the housing portions so that heaters on each housing portion can uniformly heat both sides of the glass sheets.

Another object of the present invention is to provide a roller hearth furnace including a plurality of horizontally elongated furnace modules aligned in an end-to-end relationship and each having a lower housing portion fixedly mounted in an upwardly opening manner as well as an upper housing portion mounted for vertical movement between a lower closed position immediately over its associated lower housing and an upper open position where the associated lower housing portion is accessible from each elongated side thereof, and each upper housing portion includes end walls that prevent the escape of heat from the furnace when one of the upper housing portions is moved upwardly to its open position while the others remain in their lower closed positions.

A further object of the present invention is to provide a roller hearth furnace for heating sheets of glass which includes a housing having an upper portion movable in a vertical direction between a lower closed position and an upper open position and a counterbalance mechanism for the upper housing portion which has generally elongated flexible members (such as chains) that are attached in pairs to common counterweights in a manner that permits each upper housing portion to be counter-balanced even if one of its flexible members should break.

In carrying out the foregoing objects, as well as other objects, a roller hearth furnace according to the present invention includes a plurality of horizontally elongated furnace modules aligned with each other in an end-to-end relationship. A horizontal roller conveyor of the furnace carries glass sheets through the furnace with their planes oriented horizontally. The housing of each furnace module is of a hollow construction and has a generally circular cross-section defined by upper and lower housing portions having complementary semicircular configurations. The lower housing portions are fixedly mounted in upwardly opening orientations and the upper housing portions open downwardly and are located immediately over their associated lower housing portions in closed positions during use. Heating elements on both the lower and upper housing portions heat the glass sheets on both their upper and lower sides in a uniform manner when the furnace is operating. The upper housing portions are mounted independently of each other for vertical movement between the lower closed positions and upper open positions where their associated lower housing portions are accessible from each elongated side thereof.

The upper housing portions of the furnace modules each have end walls of semicircular configurations that prevent heat from escaping from the furnace when one of the upper housing portions is in its open position while ones adjacent to it are closed. Both the upper and lower housing portions of the end furnace modules where glass enters and leaves the furnace include reinforced end walls of refractory material that define horizontal openings through which the glass passes, and the reinforcement of these end walls maintains the horizontal openings with a uniform size even if the refractory material cracks.

A counterbalance mechanism for each furnace module counterbalances the upper housing portion thereof during movement between its open and closed positions. The counterbalance mechanisms each include four separate generally elongated flexible members taking the form of chains that support the corners of the associated upper housing portion. The chains of each counterbalance mechanism extend between their associated upper housing portion and an upper support structure above the furnace in block and tackle arrangements to provide a mechanical advantage in the counterbalancing. The two chains that support each end of their associated upper housing portion are connected to a common counterweight so that either of these chains can carry the counterbalancing force of the other if one should break. The pairs of chains are connected to their common counterweight by pivotal connections of each chain to a coupling member which itself has a single pivotal connection to the common counterweight. Pivotal movement of the coupling member when one chain breaks ensures that the other chain is only loaded axially and is not torqued sideways in a manner that could cause it to also break. The chains supporting opposite ends of each upper housing portion are trained over sprockets on the opposite ends of an elongated control shaft so as to synchronize the vertical movement of both ends of each upper housing portion.

Each counterbalance mechanism includes a reversible electric motor driving one of its chains so as to aid in the movement of its associated upper housing portion between the open and closed positions. The electric motor is controlled by an elongated operator handle that extends along the length of the associated upper housing portion. The operator handle thus permits the vertical position of the upper housing portion to be controlled from any longitudinal position along the length of the furnace module.

Each furnace module has vertical guides mounted on its ends and received between rollers on the upper support structure above the furnace so as to guide the upper housing portions between their open and closed positions. The counterbalance mechanism for each upper housing portion and the vertical guides thereof thus cooperate in controlling the movement of the upper housing portions.

BRIEF DESCRIPTION OF THE DRAWINGS

FIG. 1 of the drawings, which includes FIG. 1A and FIG. 1B, shows a side elevation view of a glass tempering system which includes a roller hearth furnace embodying the present invention;

DETAILED DESCRIPTION OF THE PREFERRED EMBODIMENT

Figure 1B:
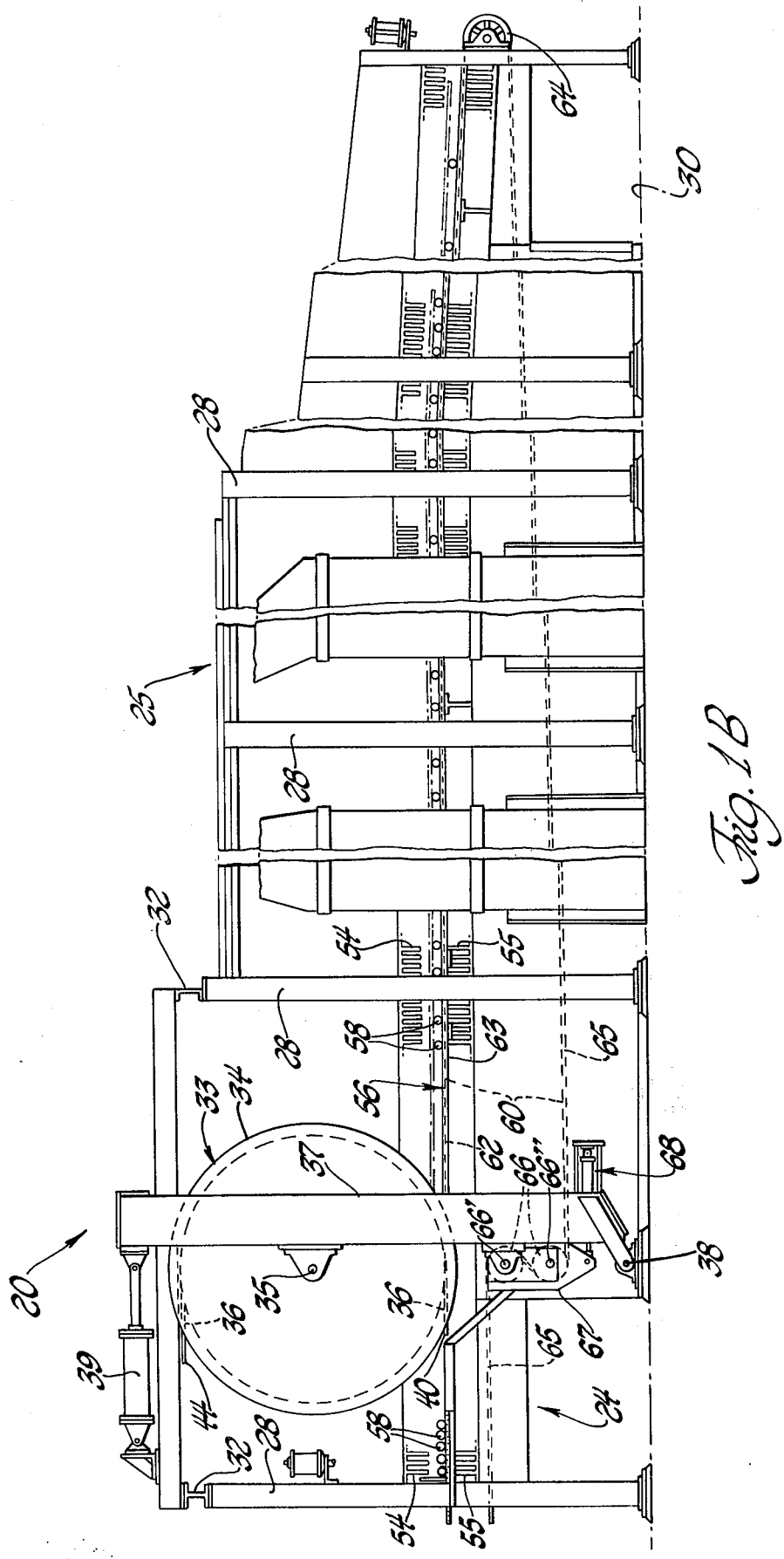

Referring to FIGS. 1A and 1B, a glass tempering system is collectively indicated by reference numeral 20 and includes a roller hearth furnace 22 shown in FIG. 1A, a quenching unit shown only partially and indicated by reference numeral 24 in FIG. 1B, and a cooling unit 25 also shown by FIG. 1B. The glass tempering system 20 heats sheets of glass as they are conveyed through the furnace 22 and then quenches the glass sheets as they are conveyed through the quenching unit 24 by spraying pressurized air onto both sides of the glass. The glass is then further cooled by pressurized air in cooling unit 25 until it is cool enough to handle. The heating and cooling sequence tempers the glass to improve its mechanical properties.

Figure 2:
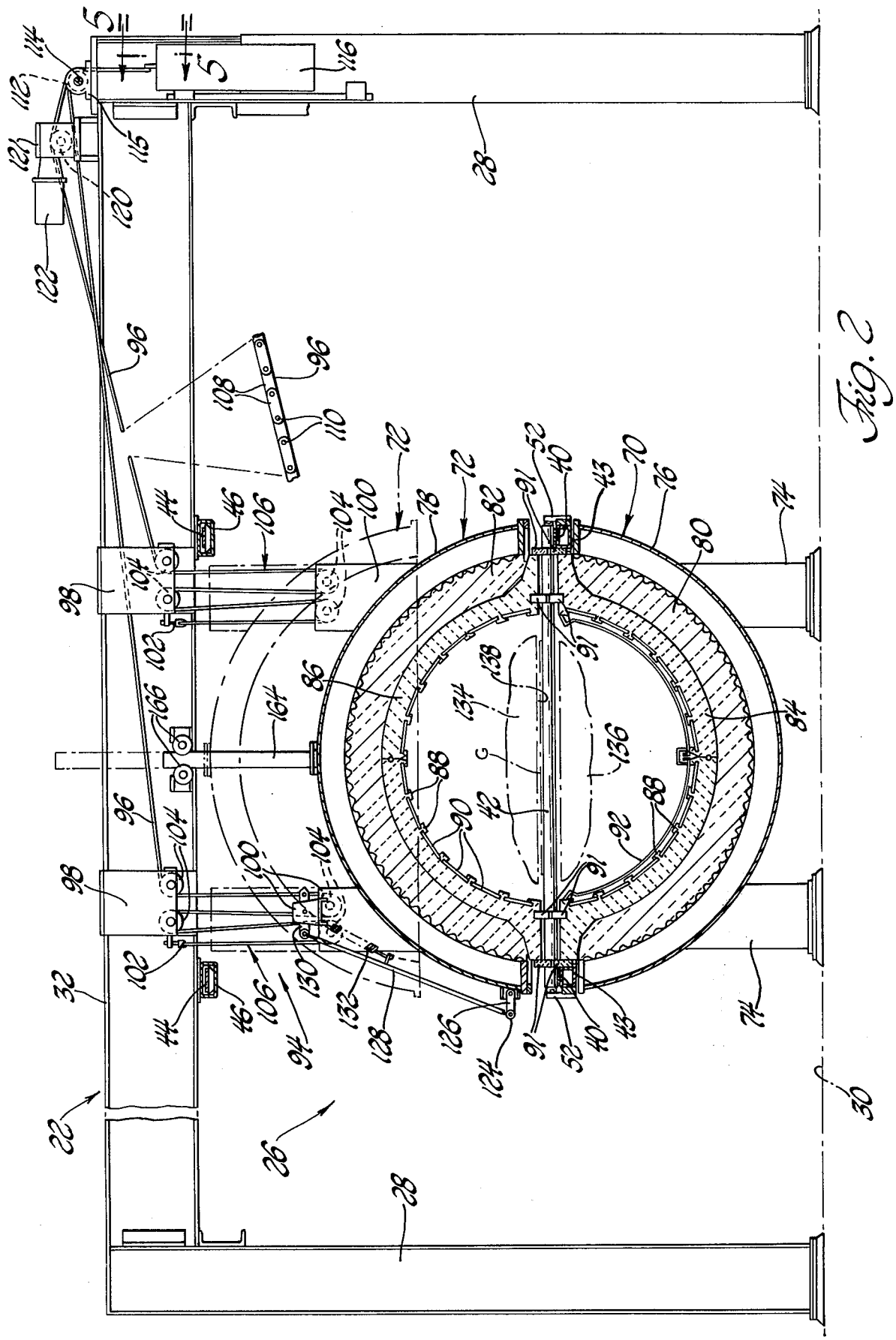
FIG. 2 is a cross-sectional view of the furnace taken along line 2—2 of FIG. 1A.

The roller hearth furnace 22 includes a plurality of horizontally elongated furnace modules indicated by reference numerals 26. A supporting framework for the furnace 22 and the rest of the tempering system includes a plurality of vertical support beams 28 that extend upwardly from the floor 30 as well as a plurality of cross beams 32, see FIG. 2, that provide an upper support structure above the furnace modules 26. A conveyor 33 for the furnace 22, see FIGS. 1A and 1B, includes large diameter belt sheaves 34 mounted on the furnace framework by pintles 35 at each end of the furnace. One pair of end belt sheaves 34 is located adjacent each lateral side of the furnace and drives an associated continuous drive belt 36 along the length of the furnace. The right-hand end belt sheaves 34, FIG. 1B, at each side of the furnace are mounted on respective vertical support members 37, only one shown, each of which has a lower end pivoted to the floor 30 by a pin 38. A hydraulic unit 39 mounted on an upper beam of the furnace framework is connected to the upper end of each support member 37. Extension and retraction of hydraulic unit 39 causes clockwise and counterclockwise movement of support member 37 about its lower pin 38 to control the tension of its associated drive belt 36. The drive belts 36 have lower runs 40 whose upper sides support the opposite ends of drive rollers 42 on which sheets of glass G, see FIG. 2, are conveyed through the furnace from the left to the right as viewed in FIGS. 1A and 1B. The lower belt runs 40 are slidably supported by tubular members 43, see FIG. 3, which extend along the length of the furnace and may receive a coolant liquid to prevent excessive heating of the drive belts. The drive belts 36 also have upper runs 44, seen in FIG. 2, where they are received within tubular members 46 supported by the upper support structure provided by the cross beams 32. The tubular members 46 extend between the end belt sheaves 34 to thereby enclose and protect their associated upper drive belt runs 44.

The end belt sheaves 34 at the left-hand end of the furnace, FIG. 1A, are driven in a clockwise direction by drive chains 48, only one shown, of a drive unit indicated by reference numeral 50. The clockwise rotation of the left-hand belt sheaves 34 causes the lower runs 40 of drive belts 36 to move from the right-hand end of furnace 22 where heated glass sheets leave the furnace toward the left-hand end of the furnace where the unheated glass enters the furnace. The ends of rollers 42 are received between upstanding positioners 52 that prevent the rollers 42 from moving along the length of the furnace as the lower belt runs 40 move toward the left. Consequently, the friction between the rollers 42 and the drive belt lower runs 40 rotates the rollers in a clockwise direction, as viewed in FIGS. 1A and 1B, and thereby causes the sheets of glass placed on top of the roller between their ends to be conveyed through the furnace 22 moving from the left to the right.

After leaving the furnace 22, heated sheets of glass are conveyed through the quenching unit 24 between a bank of upper nozzles 54 and a bank of lower nozzles 55. Pressurized air is supplied to these nozzles at a lower temperature relative to the heated glass to thereby quench the glass. A conveyor 56 receives the glass as it leaves the right-hand end of furnace 22 and moves it through the quenching unit 24 and the cooling unit 25 which also has upper and lower banks of nozzles 54 and 55 that are fed pressurized air to further cool the glass to a temperature where it can be handled. Conveyor 56 includes elongated rollers 58 that extend transversely with respect to the elongated direction of the glass tempering system and are rotatably supported at their opposite ends so their upper sides between their ends carry the glass sheets through the quenching and cooling units. The rollers 58 are located longitudinally with respect to the tempering system by suitable positioners that are unshown but which function in the same manner as the roller positioners 52 of the furnace conveyor. The ends of the rollers 58 are driven by a pair of drive chains 60, only one shown, on opposite sides of the furnace. An upper run 62 of each drive chain 60 supports the adjacent ends of the rollers 58 and is itself slidable along a planar surface within an elongated rail 63. The right-hand end of each drive chain 60 extends over an end pulley 64 at the end of the glass tempering system. The left-hand end of each drive chain 60 extends over an unshown end pulley at the right-hand end of the furnace 22. A lower reach 65 of each drive chain 60 extends between the left and right-hand end pulleys of conveyor 56 and has its intermediate portion trained over a pair of upper and lower pulleys 66 in a serpentine configuration. The upper pulley 66 pivots about a shaft 66' rotatably supported by the vertical support member 37 of the adjacent end belt sheave 34, and is driven by a suitable driving connection to this belt sheave. The lower pulley 66 is rotatably supported on the lower end of a plate 67 by a shaft 66''. The upper end of plate 67 is pivotally supported on the shaft 66'. A hydraulic unit 68 carried by the lower end of support member 37 controls the rotational position of plate 67 about shaft 66' to thereby control the tension of its associated drive chain 60. The drive chains 60 are spaced laterally inward from the drive belts 36 of the furnace conveyor so there is no interference of these drive components between the right-hand end of the furnace and the adjacent belt sheaves 34 where they overlap.

With reference to FIG. 2, each furnace module 26 of the furnace includes a housing having lower and upper portions respectively indicated by reference numerals 70 and 72. The lower housing portion 70 has a semicircular configuration and is fixedly mounted on the floor 30 by legs 74. The upper housing portion 72 is mounted for vertical movement, in a manner that will be hereinafter described, so as to be movable between the lower solid line closed position and the upper phantom line open position. In the lower closed position, each upper housing portion is located immediately over its associated lower housing portion and thereby closes the interior of the furnace to prevent the escape of heat. In its upper position, each upper housing portion permits access to the interior of the furnace from either elongated side of the furnace housing for removal of broken glass therefrom or replacement of rollers 42. A number of unshown pins on either the upper or lower housing portion are received within the unshown V-shaped slots in the other housing portion in its proper location upon movement to the lower closed position.

Each of the lower and upper housing portions 70 and 72 has a semicircular cross-section of a hollow construction as seen in FIG. 2. The lower and upper housing portions 70 and 72 respectively include metallic semicircular outer shells 76 and 78, semicircular insulating layers 80 and 82, and semicircular refractory layers 84 and 86. The refractory layers 86 of the housing portions include T-shaped projections 88 that extend radially inward and receive heater elements 90. The lower housing portion 70 has a semicircular stainless steel shield 92 located over its heater elements 90 so that broken glass falling downward will not fall onto the heater elements and thereby damage them. The circular configuration of the furnace module housing with the upper housing portion 72 in its closed position permits the heater elements 90 to uniformly heat the sheets of glass G on both of their sides as they are conveyed through the furnace module by the conveyor rollers 42. The conveyor rollers 42 are preferably made of fused silica so as to have desirable thermal properties for this use. Heat seals 91 on the lower and upper housing portions engage each other and the rollers 42 to mitigate heat loss of the furnace during use.

The upper housing portion 72 of each furnace module is supported for movement between its lower closed position and its upper open position by an associated counterbalance mechanism 94, FIG. 2. The counterbalance mechanism includes a pair of chains 96 associated with each end of the elongated upper housing portion 72, thus making a total of four chains for each. Brackets 98 are mounted on the cross beam 32 of the upper support structure for the furnace and associated brackets 100 are mounted on the upper housing portion 72 below the brackets 98. The chains 96 have first ends that are secured to the brackets 98 by bolts 102 and extend back and forth over sprocket sheaves 104 on the brackets 98 and 100 in block and tackle arrangements indicated by 106. The chains 96 extend from the block and tackle arrangements 106 to the right and slightly upwardly as viewed in FIG. 2. As seen by the enlarged portion of FIG. 2 and by FIG. 5, each chain 96 includes spaced pairs of links 108 that are interconnected by pins 110 in a conventional manner. Both chains 96 at each end of the upper housing portion 72 extend over respective sprockets 112 at the ends of an elongated control shaft 114, FIG. 1, that extends parallel to its associated furnace module. The shaft 114 of each furnace module is rotatably supported on the upper support structure of the furnace by journals 115 so as to be freely rotatable in either direction. From the sprockets 112, the chains 96 at each end of the upper housing portion 72 extend downwardly for connection to a common counterweight 116. Each counterweight 116 is of a sufficient weight to support one half of the weight of the upper housing portion 72 through the mechanical advantage provided by the block and tackle arrangements 106. The chains 96 are sufficiently strong so that one of them can hold its associated end in the open position if its adjacent chain 96 should break. Thus, should one chain break, the three remaining chains will maintain the upper housing portion 72 in its open position.

Figure 5:
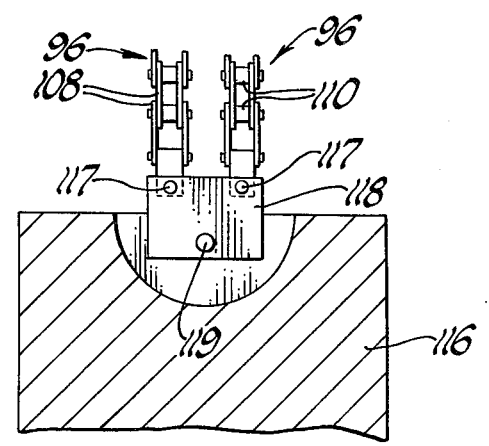
FIG. 5 is a partially sectioned view taken along line 5—5 of FIG. 2.

As seen in FIG. 5, each chain 96 has its end pivotally connected by an associated pin 117 to a coupling member 118 which is itself pivoted to the counterweight 116 by a pin 119. Should either chain 96 break, the coupling member 118 pivots about pin 119 so that the total weight of counterweight 116 is carried axially along the other unbroken chain. The unbroken chain is thus not torqued sideways in a manner that could cause it to also break.

As seen in FIG. 2, the chain 96 that extends from the block and tackle arrangement 106 closest to counterweight 116 passes over a drive sprocket 120 that is supported by a bracket 121 on the cross beam 32. A reversible DC electric motor 122 also mounted on bracket 121 drives sprocket 120 so as to thereby drive the chain 96 which passes over it. The movement of the driven chain 96 moves its attached counterweight 116 as well as the other chain 96 at the adjacent end of the upper housing portion and, through the elongated control shaft 114, also drives the two chains 96 and counterweight 116 associated with the other end of the housing. The vertical movement of both ends of the upper housing portion 72 is thus coordinated by the elongated control shaft 114 to maintain the housing portion level.

An elongated operator handle 124 is associated with each furnace module 26 and is mounted on the upper housing portion 72 thereof extending longitudinally between each of its ends. As seen in FIG. 2, each end of control handle 124 is supported by a link 126 pivoted to the outer shell 78 of the upper housing portion. The control handle 124 is pivotally connected to the lower end of a control rod 128 whose upper end is pivoted to a link 130 which is itself pivoted to the bracket 100 that supports the lower sheaves 104 of the left-hand block and tackle arrangement 106. The bracket 100 also attaches one end of an elongated helical spring 132 whose other end is secured to control rod 128 intermediate its ends. The spring 132 normally positions the control rod 128 in an intermediate vertical position so that the handle 124 can be moved both upwardly and downwardly. The movement of handle 124 pivots the upper link 130 to actuate switching circuitry, not shown, that energizes the motor 122 to drive the upper housing portion upward or downward depending on the direction link 130 is pivoted. Upward movement of handle 124 causes motor 122 to drive the upper housing portion 72 toward its open position. Downward movement of handle 124 energizes motor 122 to drive the upper housing portion toward its closed position. Limit switches may be utilized to terminate the motor operation in any one direction when the position being driven to is reached. Since the operator handle 124 extends along the length of the furnace module 26, the upper housing portion 72 may be controlled by an operator from any position along the length of the module.

The counterbalance mechanism 94 associated with each furnace module 26 supports its associated upper housing portion 72 for movement between its open and closed positions independently of the others. If one of the furnace modules must be opened to remove broken glass, it is not necessary to open the others but merely to energize the electric motor of the particular furnace module to drive its upper housing portion to the open position in the manner previously described. Each upper housing portion includes semicircular end walls 134 that prevent heat escape from the furnace when one of the furnace modules has its upper housing portion moved to its upper open position while the others remain in the lower closed positions. These end walls 134 prevent heat from moving axially from the open upper housing portion through the area occupied by the end walls, and also prevent heat from moving out of an adjacent closed upper housing portion into the open one and then escaping therefrom to the environment through the area occupied by the end walls of the open one.

The adjacent ends of the lower housing portions 70 do not include end walls and thus communicate with each other. However, where glass enters and leaves the furnace 22, the two end lower housing portions include semicircular end walls 136 that cooperate with the adjacent end walls 134 of the upper housing portions to define horizontal openings 138 through which the sheets of glass pass. The end walls 134 and 136 defining openings 138 each have a construction like the one upper end wall 134 shown in FIGS. 4 and 5. This wall construction includes a wall portion 140 that has a semicircular shape when viewed along the elongated direction of the furnace and is composed of refractory material which mitigates heat loss. The end wall portion 140 is insulated by a plurality of spaced insulating layers 142 that also have semicircular shapes congruent with the end wall portion. The insulating layers 142 are spaced from each other by insulating spacers 144 located between them at their peripheries, and are secured to each other by a plurality of bolts 146, only one shown, extending through to a threaded member 148 that engages a flange 150 of the furnace insulating layer 82. A sheet metal cover 151 encloses the insulating layers 142 of the wall and has slits 152 in its lower edge, FIG. 3, that permit thermal expansion without stressing the cover.

Figure 3:
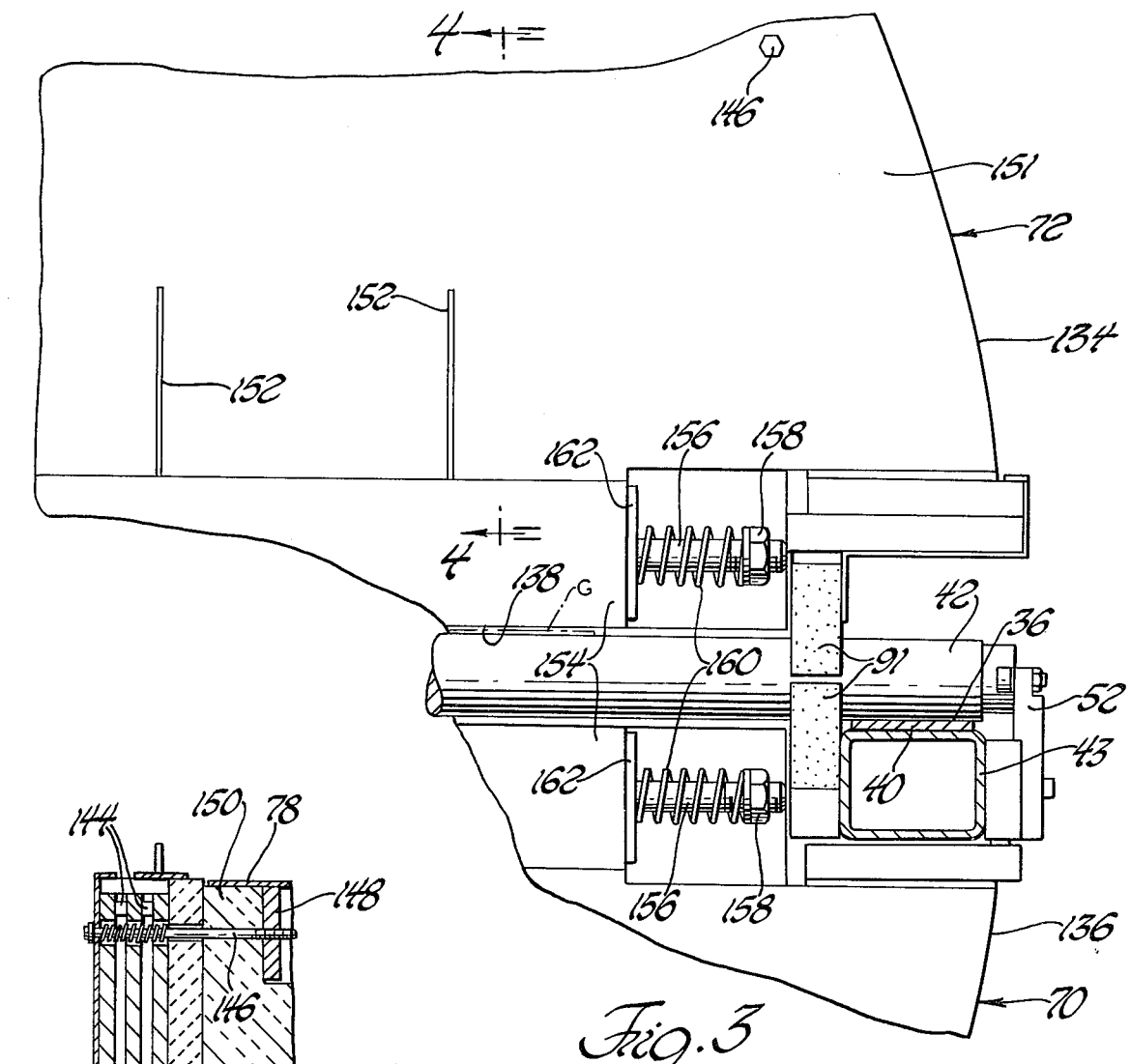
FIG. 3 is a partially sectioned end view of the furnace taken along line 3—3 of FIG. 1A.
Figure 4:
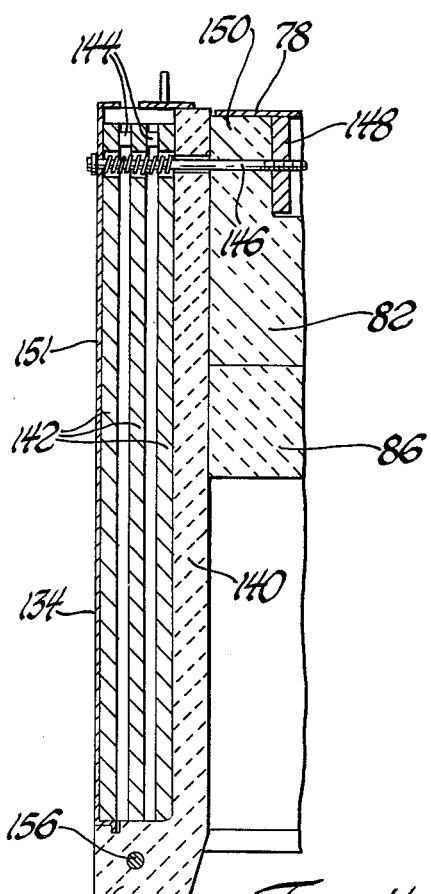
FIG. 4 is a sectional view of an end wall of the furnace taken along line 4—4 of FIG. 3.

The lower edge 154 of wall portion 140 has a greater thickness than the rest of the wall portion and receives a metal rod 156 that reinforces the wall construction. At each of its ends, rod 156 is threaded to receive a nut 158 as seen in FIG. 3. A helical spring 160 encircles each end of rod 156 and has one of its ends engaged with the adjacent nut 158 and its other end engaged with a plate 162 that is itself engaged with the adjacent end of wall edge 154. The rod 156 is positioned by the spring 160 and maintains the horizontal opening 138 between the upper and lower end walls 134 and 136 with a uniform size even if the refractory material of wall edge 154 should crack due to thermal stresses. Maintaining the opening 138 with a uniform size is necessary at the exit end of the furnace 22 where the glass enters the quenching unit 24 in order to maintain a uniform temperature of the glass along its width just prior to quenching. By maintaining the glass temperature uniform just prior to the quench, the glass is tempered uniformly.

Vertical guides 164 mounted on opposite ends of the upper housing portions 72, FIG. 2, are slidably received between rollers 166 mounted on the cross beams 32 to cooperate with the counterbalance mechanisms 94 in controlling the movement of the upper housing portions between their open and closed positions. The rollers mitigate friction during the vertical movement.

While a preferred embodiment of the invention has been described in detail, those skilled in the art will recognize alternative ways of carrying out the invention which is described in the following claims.

What is claimed is:

1. A roller hearth glass furnace for heating sheets of glass, the furnace comprising: a horizontally elongated housing of a hollow construction having a circular cross-section; the housing including upper and lower portions of semicircular cross-sections; the lower housing portion being fixedly mounted in an upwardly opening orientation; the upper housing portion being of a semicircular cross-section complementary to the lower housing portion; means mounting the upper housing portion for movement between open and closed positions with respect to the lower housing portion; the upper housing portion being positioned over the lower housing portion while in the closed position to cooperate therewith in defining the circular cross-section of the housing; the upper housing portion permitting access to the interior of the housing while in the open position; said mounting means including counterbalance means and reversible drive means for moving the upper housing portion between its open and closed positions along a predetermined path; roller conveyor means for carrying sheets of glass horizontally through the housing with the planes thereof oriented horizontally and located at the juncture between the upper and lower housing portions; and heating means on both the upper and lower housing portions so as to uniformly heat the sheets of glass on both sides thereof upon being conveyed through the furnace.

2. A furnace according to claim 1 wherein the upper housing portion is supported for vertical movement between the open and closed positions so that the interior of the furnace is accessible in the open position from either elongated side of the housing.

3. A furnace according to claim 2 wherein the upper housing portion includes vertical guides controlling its upward and downward movement.

4. A furnace according to claim 1 wherein each housing portion includes an inner layer of refractory material, an insulating layer, and an outer shell.

5. A furnace according to claim 1 wherein there is a plurality of elongated housings aligned in an end-to-end relationship with respect to each other to provide furnace modules through which the sheets of glass are conveyed.

6. A furnace according to claim 1 wherein the housing portions include end walls at one end of the furnace that cooperatively define a horizontally extending opening through which the sheets of glass move upon being conveyed through the furnace.

7. A furnace according to claim 1 wherein the upper housing portion is moved vertically between the open and closed positions and is supported at each of its four corners by chains connected to counterweights to provide the counterbalancing thereof.

8. A furnace according to claim 1 wherein the lower housing portion includes a shield which prevents broken glass from falling onto the heating means on the lower housing portion.

9. A roller hearth glass furnace for heating sheets of glass, the furnace comprising: a plurality of horizontally elongated furnace modules aligned with each other in an end-to-end relationship; each furnace module being of a hollow construction and including upper and lower housing portions; the lower housing portions being fixedly mounted and having upwardly opening constructions; the upper housing portions having hollow constructions that open downwardly; support means independently mounted each upper housing portion for vertical movement between a lower closed position closing the upper side of its associated lower housing portion and an upper open position where its associated lower housing portion is accessible from each elongated side thereof; each upper housing portion including end walls at each end thereof for mitigating heat loss when one of the upper housing portions is located in its upper open position while the others are in closed position; said support means for each upper housing portion including counterbalance means and reversible drive means for moving the associated upper housing portion between its open and closed positions along a predetermined path; roller conveyor means for carrying sheets of glass horizontally through the furnace with their planes located at the juncture between the upper and lower housing portions of each furnace module; and heating means on at least one of the housing portions of each furnace module so as to heat the sheets of glass upon being conveyed through the furnace.

10. A furnace according to claim 9 wherein the furnace modules have circular cross-sections defined by semicircular cross-sections of the lower housing portions and complementary semicircular cross-sections of the upper housing portions.

11. A furnace according to claim 9 having an upper housing portion end wall where glass leaves the furnace constructed of a reinforced refractory material, the reinforcement of the refractory material being provided by a rod that extends through said refractory material.

12. A furnace according to claim 11 wherein a pair of springs extend between the refractory material and the ends of the rod to position the rod with respect to the refractory material.

13. A furnace according to claim 11 wherein the lower housing portion associated with the upper housing portion having the reinforced end wall of refractory material likewise has an end wall of reinforced refractory material that cooperates with the upper reinforced end wall to define a horizontal opening through which glass leaves the furnace.

14. A furnace according to claim 13 wherein the upper and lower housing portions where glass enters the furnace also include end walls of a reinforced refractory material that define a horizontal opening through which the glass sheets pass as they enter the furnace.

15. A roller hearth glass furnace for heating sheets of glass, the furnace comprising: a horizontally elongated housing of a hollow construction; the housing including upper and lower portions having rectangular configurations when viewed in a vertical direction; the lower housing portion being fixedly mounted and having a hollow construction that opens upwardly; the upper housing portion having a hollow construction that opens downwardly so as to close the upwardly opening lower housing portion; a counterbalance mechanism mounting the upper housing portion for vertical movement between a lower closed position closing the upper side of the lower housing portion and an upper open position where the lower housing portion is accessible from both elongated sides of the housing; the counterbalance mechanism supporting each corner of the upper housing portion by a separate generally elongated flexible member; the flexible members including means for attaching these flexible members to at least one common counterweight in a manner that permits the others to counterbalance the upper housing portion if one should break; roller conveyor means for carrying sheets of glass horizontally through the housing with the planes thereof oriented horizontally and located at the juncture between the upper and lower housing portions; and heating means on at least one of the housing portions so as to heat the sheets of glass upon being conveyed through the furnace.

16. A furnace according to claim 15 wherein the elongated flexible members take the form of chains.

17. A furnace according to claim 15 wherein the furnace includes an electric motor that drives the upper housing portion between the open and closed positions.

18. A furnace according to claim 17 wherein the furnace includes an operator handle mounted on the upper housing portion so as to control the electric motor.

19. A furnace according to claim 18 wherein the operator handle is elongated and extends along the elongated length of the housing so that an operator may control the electric motor operation from any position along the length of the housing.

20. A furnace according to claim 17 where the electric motor drives one of the elongated flexible members to move the upper housing portion between the open and closed position.

21. A furnace according to claim 17 wherein the counterbalance mechanism supports the upper housing portion on a support structure located above the furnace housing.

22. A furnace according to claim 21 wherein the elongated flexible members extend between sheaves on the support structure and on the upper housing portion to provide block and tackle arrangements for supporting the upper housing portion.

23. A furnace according to claim 22 wherein a pair of counterweights are associated with the opposite ends of the housing, and wherein the elongated flexible members at each end of the housing are each connected to the counterweight associated therewith so that each counterweight can support its associated end of the upper housing portion by only one of the elongated flexible members associated therewith.

24. A furnace according to claim 23 wherein an elongated control shaft associated with the upper housing portion has each flexible member thereof drivingly engaged with the control shaft to coordinate the movement of the flexible members and thereby the movement of each end of the associated upper housing portion.

25. A furnace according to claim 24 wherein an electric motor mounted on the support structure drives one of the elongated flexible members to move the upper housing portion between the open and closed positions.

26. A furnace according to claim 21 wherein each end of the upper housing portion mounts a separate vertical guide slidably received by the support structure to guide the upper housing portion during movement between the open and closed positions.

27. A furnace according to claim 26 wherein each vertical guide is received between an associated pair of rollers on the support structure to mitigate friction generated as the upper housing portion is guided between the open and closed positions.

28. A roller hearth glass furnace for heating sheets of glass prior to tempering thereof, the furnace comprising: a plurality of elongated furnace modules aligned with each other in an end-to-end relationship; each furnace module being of a hollow construction and including upper and lower housing portions; the lower housing portions being fixedly mounted and having upwardly opening constructions of semicircular cross-sections; the upper housing portions having downwardly opening constructions of semicircular cross-sections that are complementary to the lower housing portions to give the furnace modules circular cross-sections; a counterbalance mechanism independently mounting each upper housing portion for vertical movement between a lower closed position closing the upper side of its associated lower housing portion and an upper open position where its associated lower housing portion is accessible from each elongated side thereof; the upper housing portions having end walls at each end thereof for mitigating heat loss when one of the upper housing portions is located in its upper open positions; the two furnace modules at each end of the furnace also having end walls on the lower housing portions thereof that cooperate with adjacent upper housing portion end walls to define horizontal openings through which glass enters and leaves the furnace; roller conveyor means for carrying sheets of glass horizontally through the furnace with the planes thereof oriented horizontally and located at the juncture between the upper and lower housing portions; and heating means on the upper and lower housing portions of each furnace module so as to heat the sheets of glass on both sides thereof upon being conveyed through the furnace.

29. A roller hearth glass furnace for heating sheets of glass prior to tempering thereof, the furnace comprising: a plurality of elongated furnace modules aligned with each other in an end-to-end relationship; each furnace module being of a hollow construction and including upper and lower housing portions; the lower housing portions being fixedly mounted and having upwardly opening constructions of semicircular cross-sections; the upper housing portions having downwardly opening constructions of semicircular cross-sections that are complementary to the lower housing portions to give the furnace modules circular cross-sections; a counterbalance mechanism independently mounting each upper housing portion for vertical movement between a lower closed position closing the upper side of its associated lower housing portion and an upper open position where its associated lower housing portion is accessible from each elongated side thereof, each counterbalance mechanism including four chains supporting the corners of its associated upper housing portion in block and tackle arrangements, an elongated control shaft having a pair of sprockets at each end thereof, the two chains supporting each end of the associated upper housing portion being engaged with the two sprockets on one of the ends of the control shaft so said shaft coordinates the movement of each end of the associated upper housing portion, and a pair of counterweights each of which includes means connecting it to the two chains which support one end of the associated upper housing portion so the counterweight can function even if one chain breaks; a plurality of reversible electric motors respectively associated with the furnace modules, each motor driving one of the chains of the associated counterbalance mechanism to move the upper housing portion thereof between its open and closed positions, and a plurality of elongated control handles respectively associated with the furnace modules extending along the length thereof and movable to control the operation of the motor of its particular furnace module by an operator positioned at any location along the length thereof; the upper housing portions having end walls at each end thereof for mitigating heat loss when one of the upper housing portions is located in its upper open position while the others are closed; the lower housing portions of the furnace modules at each end of the furnace having end walls that cooperate with the adjacent end walls of their associated upper housing portions to define horizontal openings through which the sheets of glass enter and leave the furnace, the end walls defining said horizontal openings being constructed of refractory material and each being reinforced by a rod so as to maintain a uniform size to the openings defined thereby even if the refractory material should crack; roller conveyor means for carrying sheets of glass horizontally through the furnace with the planes thereof oriented horizontally in alignment with the horizontal openings between the end walls of the housing portions; and heating means on both the upper and lower housing portions of each furnace module so as to heat the sheets of glass on both sides thereof upon being conveyed through the furnace.

* * * * *

UNITED STATES PATENT OFFICE
CERTIFICATE OF CORRECTION

Patent No. 3,947,242                Dated  March 30, 1976

Inventor(s)   Harold A. McMaster and Norman C. Nitschke

It is certified that error appears in the above-identified patent and that said Letters Patent are hereby corrected as shown below:

Column 1, line 54, after "housing" insert --portion--.

Column 9, line 33, delete "mounted" and insert --mounting--.

Column 10, line 60, delete "17" and insert --15--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*